May 12, 1936.   M. E. THOMPSON   2,040,508
METHOD OF OPERATING SMALL OUTPUT ALTERNATING CURRENT
MOTORS AND CIRCUIT ARRANGEMENTS THEREFOR
Filed Nov. 15, 1933

CLOSED WHEN STARTING

LOW INDUCTANCE

CLOSED DURING STARTING

HIGH INDUCTANCE

OPENED WHEN STARTING

INVENTOR
Milton E. Thompson,
BY
Bartlett, Eyre, Scott & Keel
ATTORNEYS

Patented May 12, 1936

2,040,508

UNITED STATES PATENT OFFICE 2,040,508

METHOD OF OPERATING SMALL OUTPUT ALTERNATING CURRENT MOTORS AND CIRCUIT ARRANGEMENTS THEREFOR

Milton E. Thompson, Ridgway, Pa.

Application November 15, 1933, Serial No. 698,042

11 Claims. (Cl. 172—233)

My present invention relates to small output synchronous motors such as are used for driving the hands of electric clocks and comprises a method of modifying the power input to such motors to improve the overall efficiency thereof. My invention also includes the combination with such motors of circuit means for carrying out the method. My invention, while more particularly concerned with methods and apparatus for improving the efficiency of small non-self-starting synchronous motors of the type described and claimed in my co-pending application Serial No. 661,218, filed March 17, 1933, of which the present application is in part a division, is adapted to be used to advantage with self-starting synchronous motors or with non-self-starting motors differing from that disclosed in my said application.

The power required to operate the hands of a clock is small, being in the neighborhood of one twenty-millionth of a horsepower. Synchronous motors of the type now on the market require a power input in the neighborhood of two and a half to three watts and are extremely inefficient; the major portion of the input power being wasted in the motor. This is due largely to the fact that the physical size of these clock motors is many times greater than would be required to give the very small power output necessary to operate a clock and it would be impractical to construct a motor of such small dimensions as would correspond to this small output. Most of these motors are of the bi-polar type and are constructed with a single field coil. The rotor usually has no windings of any kind and for this reason the magnetic reaction of the rotor is very weak. As a consequence the power input to the motor is nearly constant under all conditions. The motor may be running at synchronous speed without any load or carrying the maximum load it is capable of carrying or it may be standing still. In either case the power input is almost identically the same.

The input to such a motor is therefore quite similar to the input to an inductance coil and is controlled almost entirely by the number of turns on the field coil. If a motor is designed for an input of 2 to 3 watts and the field coil is wound with the proper number of turns to give this input, such a motor will usually have quite a strong magnetic field. Now if we increase the number of field coil turns we will get a decrease in watts input, a decrease in amperes input and a decrease in power factor. There will be a decrease in magnetic field strength and also a decrease in the pulling power of the motor, but the decrease in watts input will be much greater than the decrease in power capacity. It is usually impractical to obtain the desired amount of field weakening by increasing the number of field turns, even when quite small diameter of wire is used. I have found that a much more effective expedient is to place, in series with the field coil, a condenser having a capacity particularly selected with reference to the inductance of the field coil. Such a condenser will effectively reduce the power input to the motor provided the capacity of the condenser is of such value that its reactance is more than twice the inductive reactance of the field coil.

A series connected condenser may also be used to increase the power input to a motor when desired, as for example, during starting of a self-starting motor, or a combination of condensers arranged in parallel with switch means for opening one branch of the circuit may be used to give a higher power input at starting and a reduced input after the motor speed has attained synchronism.

In the accompanying drawing I have illustrated various embodiments of the invention as related to the operation of both self-starting and non-self-starting synchronous motors.

Figure 1:
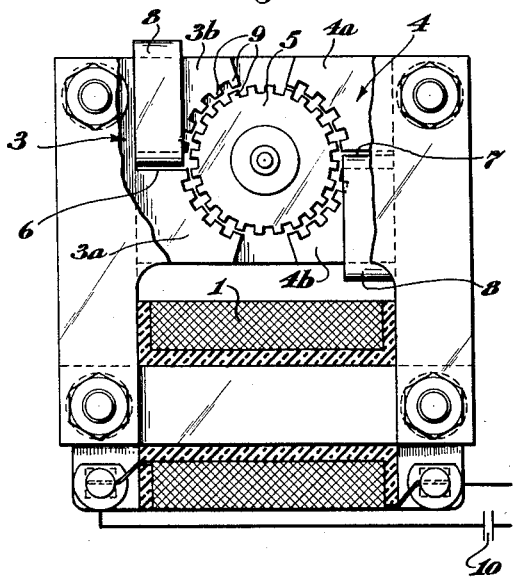
Fig. 1 is a front view, partly in section, of a slow speed non-self-starting synchronous motor of the type disclosed and claimed in my said co-pending application, having connected in series therewith a condenser for reducing the power input to the motor.

The non-self-starting single phase bi-polar motor illustrated in Fig. 1 comprises a single field coil 1 of a relatively large number of turns, a pair of pole pieces 3 and 4 and a rotor 5. The face of pole piece 3 is divided by a deep slot 6 into two sections 3a and 3b and the face of pole piece 4 is similarly divided by a slot 7 into two sections 4a and 4b. Sections 3b and 4b are each shaded by heavy copper bands 8 passing through the slots and surrounding the respective sections to cause the magnetism in the shaded section to lag behind that of the unshaded section. The rotor 5 and the pole pieces are provided with cooperating teeth 9, the teeth on the shaded sections being advanced relatively to the unshaded sections to give a fairly constant unidirectional torque. The above described single phase motor, because of its novel construction, has an extremely low power input and is more efficient than the usual small clock motor now on the market. The particular motor illustrated has a speed of 300 revolutions per minute. According to the present invention the efficiency of the motor is further improved by the provision in series with the field coil 1 of a condenser 10 having a capacity such that its reactance is more than twice the inductive reactance of the coil 1. This condition insures that the addition of the condenser in series with the field coil will decrease, rather than increase, the power input and will increase the efficiency because decreasing the current input by a relatively less amount. It also insures a leading current.

A motor constructed as above described, with a field coil of 16,000 turns of #40 enameled copper wire, a rotor of .75 inch and the dimensions of the other parts proportioned thereto in accordance with the drawing, was tested and found to operate efficiently with an input of slightly less than two-tenths of a watt when the field coil was connected directly across a one hundred and eighteen volt source of sixty cycle alternating voltage.

Assuming the cost of electrical power at five cents a kilowatt hour, the motor will cost about eight cents a year when operated without the condenser 10 in series therewith. The same motor, when a condenser of .042 microfarad was connected in series with the field coil thereof, operated with a power input of less than one-tenth of a watt; that is, at a cost of only three and half cents a year. Without the condenser the field current was a lagging current and the power factor was about thirty per cent. With the condenser, the field current was a leading current and the power factor about twenty-three per cent. The small clock motors now on the market, operating without a condenser in series therewith, have a power input of about two and a half watts and cost about one dollar and ten cents a year, that is, at a cost of over thirty times that of the motor of Fig. 1 when operated with a series condenser.

Figure 2:
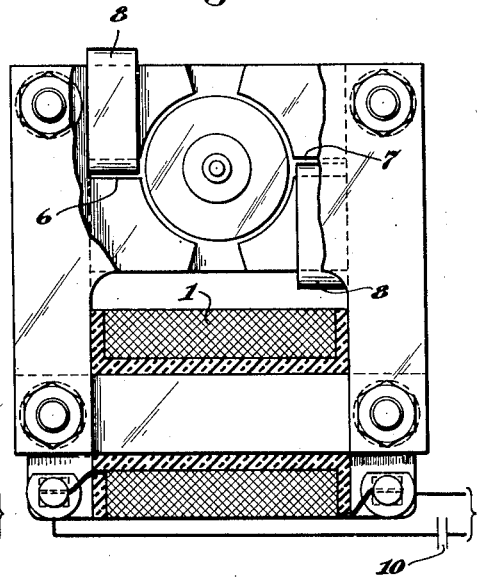
Fig. 2 is a similar view of a high speed non-self-starting motor having connected in series therewith a condenser for reducing the power input to the motor.

In Fig. 2, condenser 10 is shown connected in series with the field coil 1 of a high speed motor of substantially the construction of Fig. 1 except that the rotor and pole faces thereof are not provided with teeth. Under the same conditions as to the capacity of the condenser, namely that the capacity reactance should be greater than twice the inductance reactance of the field coil, condenser 10 serves to increase the efficiency of the motor by reducing the power input by a relatively greater amount than the reduction in the current input.

Figure 3:
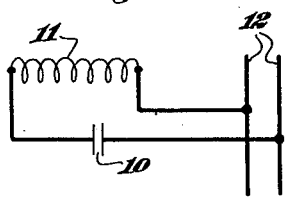
Fig. 3 is a diagram of the circuit connections for combinations of the type illustrated in Figs. 1 and 2.
Figure 4:
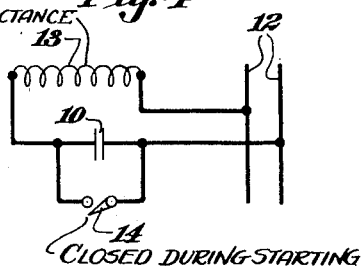

In Fig. 3 an inductance 11 and condenser 10 are shown connected in series across power lines 12. Inductance 11 represents the field coil of any non-self-starting single input circuit motor either such as are illustrated in Figs. 1 and 2 or of any single input circuit motor of the type requiring but a small power output. The efficiency of a motor having the field coil 11 will be increased by the series condenser 10 provided the capacity reactance thereof is greater than twice the inductive reactance of the coil 11.

Where greater input is desired at starting, as for example with self-starting motors having field coils of relatively smaller inductance, the condenser 10 for reducing the power input to the motor may be cut into the circuit only after the motor has reached synchronism. Figure 4 represents such an arrangement in which the condenser 10, in series with a coil 13, representing the field winding of a single input circuit self-starting motor, is adapted to be cut out of the circuit at starting by means of a switch 14 in a circuit bridging the condenser. Switch 14 may be operated automatically or manually, as desired.

Figure 5:
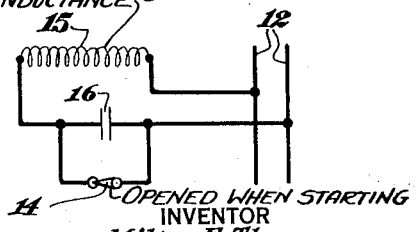

In accordance with the invention, a series condenser may be used to increase the power input to a motor as well as to decrease the same. At starting, for example, a condenser of one capacity may be connected in series with a motor to increase the input until the motor will start itself, and then cut out of the circuit and a second condenser of another capacity substituted therefor to decrease the motor input after synchronism has been obtained. In order to increase the power input the capacity reactance of the series condenser must be less than twice the inductive reactance of the field coil and for maximum input it should be exactly equal to such inductive reactance. For example, where the inductance of the field coil of a motor is so high that the motor operates at synchronism with fairly high efficiency and has a power input insufficient to permit the motor to start itself, the arrangement of Fig. 5 may be employed. In Fig. 5, 15 is the field coil of high inductance and 16 is a condenser of large capacity having a capacity reactance substantially less than twice the inductive reactance of the coil and preferably equal thereto for insuring an increased power input during starting. Condenser 16 is cut out of the circuit by means of a switch 14 when the motor has reached synchronism. Switch 14, like that of Fig. 4, may be operated manually or automatically, as desired.

Figure 6:
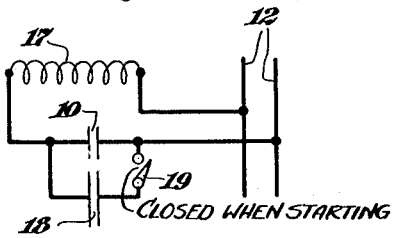
Figs. 4, 5 and 6 are diagrams of circuit connections suitable for use with high speed self-starting motors.

For high power input at starting and highest efficiency at synchronism, the circuit arrangement illustrated in Fig. 6 may be employed. In Fig. 6, inductance 17 represents the single field coil of relatively high inductance of a self-starting synchronous motor having connected in series therewith the condenser 10 having a capacity reactance greater than twice the inductive reactance of coil 12. A circuit containing a condenser 18 and a switch 19 parallels condenser 10. The capacity of condenser 18 should be relatively large, preferably about two and one half times the capacity of condenser 10 so that when switch 18 is closed the capacity reactance of the two condensers in parallel is less than twice the inductive reactance of the coil 17 so as to increase the power input to the motor to a point where the motor will easily start itself. When the motor reaches synchronous speed, switch 18 is opened, manually or automatically, and the motor, with condenser 10 in series with the field coil thereof, will then continue to operate with the reduced input suitable for highest efficiency.

Various embodiments of the invention have now been described in each of which a condenser is connected in series with the field coil of a single input circuit synchronous motor to vary the power input to the motor. In certain embodiments of the invention a single condenser is arranged to decrease the power input, in another a single condenser is arranged to increase the input at starting, and in still another a combination of condensers is arranged to cause an increased input at starting and a decreased input at synchronism. Obviously various other combinations of field coil with series connected condenser or condensers might be effected without departing from the spirit of the invention. The series connected condenser, in addition to its described function of increasing or decreasing the power input to the motor, depending upon its capacity, is also advantageous in that it serves as a protective device should a synchronous motor be inadvertently connected across direct current terminals.

Although the series condenser has herein been diagrammatically indicated as connected externally of the motor casing, obviously the condenser could and preferably would be built into the motor casing.

I claim:

1. The combination with a synchronous motor having a rotor, bi-polar toothed field and a single field coil, of a condenser connected in series with said coil and having a capacity reactance greater than twice the inductive reactance of the coil.

2. The combination with the single electrical field circuit of a synchronous motor, of a capacity for reducing the input to the motor, said capacity consisting of a condenser placed in series with said electrical field circuit and having a capacity reactance greater than twice the inductive reactance of said field circuit.

3. The combination with the single input circuit of a synchronous motor, of a condenser placed in series with said input circuit and having a capacity reactance greater than twice the inductive reactance of said input circuit.

4. The combination with a synchronous motor having a single inductive field winding, of an input circuit therefor including condensers connected in series with the field winding and switch means for varying the effective series capacity reactance of the condensers, said condensers having capacities such that when said switch means is in one position the capacity reactance of the input circuit is less than twice the inductive reactance of the field winding and when said switch means is in another position the capacity reactance of the input circuit is greater than twice the inductive reactance of the field winding.

5. The combination according to claim 4 wherein the condensers are two in number and are connected in parallel with said switch means in series with one condenser only.

6. The method of operating a single input circuit self-starting synchronous motor having a series condenser in the input circuit thereof which comprises shunting the condenser during starting of the motor and until the motor speed has reached synchronism and then opening the shunt about the condenser.

7. The method of operating a single input circuit synchronous motor having a condenser in the field circuit thereof which comprises bringing the motor speed into synchronism while the condenser is connected in series with the motor and then shunting the condenser to reduce the power input to the motor.

8. The method of operating a single input circuit synchronous motor having a variable capacity in the input circuit which comprises adjusting the series capacity reactance to a value substantially equal to the inductive reactance of the field coil and maintaining such value during starting of the motor and until the motor speed reaches synchronism and then raising the series capacity reactance to a value greater than twice the inductive reactance of the field coil.

9. The combination with a self-starting synchronous motor having a single input winding, of a condenser having a capacity such that the capacity reactance thereof is greater than twice the inductive reactance of the input winding, and switch means for placing said condenser in series with said input winding or eliminating said condenser from the circuit, whereby when the condenser is placed in series with the input winding the power input to the motor is decreased.

10. The combination with a self-starting synchronous motor having a single input winding, of a condenser having a capacity such that the capacity reactance thereof is substantially equal to the inductive reactance of the input winding, and switch means for placing said condenser in series with said input winding or eliminating said condenser from the circuit, whereby when the condenser is placed in series with the input winding the power input to the motor is increased.

11. The method of operating a single input circuit self-starting synchronous motor having a series condenser in the input circuit thereof which comprises changing the effective capacity of the condenser when the motor speed reaches synchronism.

MILTON E. THOMPSON.